United States Patent [19]

Yamada et al.

[11] Patent Number: 5,275,707
[45] Date of Patent: Jan. 4, 1994

[54] ELECTRODEPOSITION COATING COMPOSITION AND METHOD

[75] Inventors: Toshiyuki Yamada, Osaka; Masaaki Nakashio, Aichi; Yasuhiko Tsukamoto, Hyogo; Takeshi Kuninori, Osaka, all of Japan

[73] Assignee: Shinto Paint Co., Ltd., Amagasaki, Japan

[21] Appl. No.: 600,989

[22] Filed: Oct. 23, 1990

[30] Foreign Application Priority Data

Oct. 30, 1989 [JP] Japan .................. 1-282509

[51] Int. Cl.$^5$ .................. C25D 13/00
[52] U.S. Cl. .................. 204/181.1; 204/181.6; 204/181.7
[58] Field of Search .................. 204/181.1, 181.6, 181.7

[56] References Cited

U.S. PATENT DOCUMENTS

4,500,399  2/1985  Hart et al. .................. 204/181.1

FOREIGN PATENT DOCUMENTS

40035    4/1978  Japan .................. 204/181.1
201488   8/1989  Japan .

Primary Examiner—Donald R. Valentine
Assistant Examiner—Kishor Mayekar
Attorney, Agent, or Firm—Wenderoth, Lind & Ponack

[57] ABSTRACT

A method of coating a metal article by forming a first electrodeposition coating layer having varistor properties on a metal article by an electrodeposition coating method by use of an electrodeposition coating film-forming composition containing from 7 to 50 parts by weight of an electrically semiconductive substance per 100 parts by weight of the solid content of the composition, and then forming a second electrodeposition coating layer on said first electrodeposition coating layer by an electrodeposition coating method by use of an anionic or cationic electrodeposition paint while applying a voltage exceeding the varistor voltage. The coating composition thus-produced has excellent varistor properties with superior corrosion resistance.

2 Claims, No Drawings

ELECTRODEPOSITION COATING COMPOSITION AND METHOD

BACKGROUND OF THE INVENTION (1) Field of the Invention

The present invention relates to an electrodeposition coating film-forming composition capable of forming a coating film with varistor property and to a an electrodeposition coating method using said composition. In detail, it relates to an electrodeposition coating method capable of forming a coating film which imparts high throwing property, corrosion resistance, and edge cover property, by electrodeposition coating an electrodeposition coating film-forming coating composition containing a powder of an electrically semiconductive substance as a first coating layer, said coating film having varistor property and being smooth and excellent in corrosion resistance, on which a second coating layer can be further provided by electrodeposition coating.

(2) Description of Related Art

Hitherto, it has been considered to be difficult in principle to once provide deposits on a metal article to be coated by the electrodeposition coating method and after baking, further provide a second coating layer on the resulting coating film by electrodeposition coating because the first coating layer becomes electrically insulative.

However, in Japanese Patent Publication No. 24566/74, there is found an example of such two-layer electrodeposition by electrodeposition coating. The method of this Japanese Patent Publication No. 24566/74 is concerned with a method in which using black iron oxide as an essential component and an anionic electrodeposition paint composition as a vehicle, an article to be coated is subjected to electrodeposition coating and baked to form an electrically conductive coating film with marked properties regarding adhesive strength, electrical conductivity, surface characteristics, and corrosion resistance, and a second coating layer is further provided thereon by electrodeposition coating.

Furthermore, in Japanese Patent Kokai (Laid-Open) No. 51958/84, in order to improve the quality of the method of the aforesaid Japanese Patent Publication No. 24566/74, a coating film as a first coating layer is formed from a combination of a cationic electrodeposition paint composition with, as an electrically conductive substance, finely divided carbon, i.e., carbon black and/or graphite, whereby uniformity of the resulting coating film and high throwing property are attained, and in order to further improve the corrosion resistance, lead compounds such as, for example, lead silicate, lead chromate, lead acetate, or lead lactate are added.

As seen in the aforegoing examples, in order to form an electrically conductive coating film by the electrodeposition coating method, the use of an electrically conductive substance is necessary. Up to date, black iron oxide, carbon black, graphite, and metal powders (e.g., zinc, copper) have been known as the electrically conductive substance.

However, in the case of using black iron oxide as an electrically conductive substance in an electrodeposition coating composition as in Japanese Patent Publication No. 24566/74, there is involved a defect that since black iron oxide has a high specific gravity and is used in the state of an aqueous solution in which the electrodeposition paint is diluted, the precipitability is very vigorous so that in the case that an article to be coated has a complicated shape, a uniform coating film in the respective portions is not formed.

Furthermore, in the case that carbon black and/or graphite which is finely divided carbon is used as an electrically conductive substance as in Japanese Patent Kokai (Laid-Open) No. 51958/84, since the electrodeposition coating is carried out by using a cationic electrodeposition paint composition but not an anionic electrodeposition paint composition, the corrosion resistance of a formed coating film is improved. However, since carbon black and/or graphite does not basically have rust resistivity, the electrodeposition paint is inferior to usual cationic electrodeposition paints free from carbon black and/or graphite in terms of the rust resistivity, i.e., corrosion resistance. Moreover, though it is described that in order to improve this corrosion resistance, it is preferable to add a lead compound, there is involved a defect that in the case that an electrically conductive electrodeposition paint contains such a substance(s) in an amount necessary for attaining the generally required corrosion resistance in cationic electrodeposition paints, the dispersion is difficult, and a uniform electrically conductive coating film is hardly obtained.

SUMMARY OF THE INVENTION

The present inventors have made extensive investigations in order to obtain a coating with superior uniformity and corrosion resistance and having high practical usage. As a result, it has been surprisingly found that an electrodeposition coating film-forming composition which forms a coating film with varistor property forms a smooth coating film with superior corrosion resistance and overcomes the above-described defects.

DETAILED DESCRIPTION OF THE INVENTION

That is, the present invention relates to an electrodeposition coating film-forming composition capable of forming a coating film with varistor property, which contains from 7 to 50 parts by weight of a powder of an electrically semiconductive substance per 100 parts by weight of the solids content. The present invention also relates to an improved coating method which comprises forming a first electrodeposition coating layer on a metal article by electrodeposition coating with the above-described electrodeposition coating film-forming composition and then forming a second electrodeposition coating layer on the first electrodeposition coating layer by electrodeposition coating with the above-described electrodeposition coating film-forming composition or an anionic or cationic electrodeposition paint. In forming the above-described second electrodeposition coating layer, a voltage exceeding the varistor voltage of the first electrodeposition coating layer is applied.

The varistor property as referred to in the present invention means an electrical characteristic exhibiting nonlinear resistance sensitive to a change of the voltage. That is, it means a characteristic that when exceeding the critical voltage (varistor voltage), the resistance rapidly decreases to thereby flow a current.

Though coating films obtained by electrodeposition coating of paints containing conventional electrically conductive substances such as, for example, electrically conductive carbon black always exhibit electrical conductivity, the coating film with varistor property according to the present invention does not exhibit electrical conductivity at a voltage not higher than a specific voltage (varistor voltage) but exhibits first when exceeding the varistor voltage.

In more detail, in forming a first electrodeposition coating layer on a metal article to be coated by electrodeposition coating and further forming thereon a second electrodeposition coating layer by the use of an electrodeposition coating film-forming composition capable of forming a coating film with varistor property, which contains from 7 to 50 parts by weight of a powder of an electrically semiconductive substance per 100 parts by weight of the solids content, the present invention has the following characteristics. That is, the first electrodeposition coating layer with varistor property is formed first when an electrodeposition voltage exceeding the varistor voltage (critical voltage) is applied.

As the powder of an electrically semiconductive substance in the present invention, molybdenum disulfide, graphite fluoride, boron nitride, etc. can be used, with molybdenum disulfide being particularly superior and preferred from the standpoints of smoothness and corrosion resistance.

The content of the powder of an electrically semiconductive substance is from 7 to 50 parts by weight, preferably from 15 to 30 parts by weight, per 100 parts by weight of the solids content of the coating film-forming composition. If the content is less than 7 parts by weight, the electrical conductivity of a formed coating film is insufficient so that even when the voltage is increased, the second electrodeposition layer is not uniformly deposited. On the other hand, if it exceeds 50 parts by weight, the formed first electrodeposition layer causes surface roughening, resulting in undesirably adversely affecting the finish of the second electrodeposition coating layer.

If desired, the electrodeposition coating film-forming composition according to the present invention can be incorporated with color pigments, extender pigments, or rust-resistant pigments, which have hitherto been used in electrodeposition paints, so far as they do not deteriorate the varistor property. Further, the composition may be incorporated with other usual additives, activating agents, defoaming agents, or antioxidants.

As the main vehicle to be used in the electrodeposition coating film-forming composition according to the present invention, usual resins for electrodeposition coating can be used. Examples include resins for anionic electrodeposition coating such as epoxy resins, polybutadiene resins, and acrylic resins; resins for cationic electrodeposition coatings; and resins for electrodeposition powder coating (EPC).

In undergoing the electrodeposition coating by the use of the electrodeposition coating film-forming composition of the present invention, the electrodeposition coating can be carried out under an electrodeposition coating condition of a direct current of from 50 to 500 V. After rinsing with water, the coating film is suitably dried at ordinary temperature or at from 80° to 300° C. for a period of from 10 to 30 minutes.

As the paint which can be used in the electrodeposition coating of the second coating layer according to the present invention, usual anionic or cationic electrodeposition paints and EPC can be used. Further, the above-described electrodeposition coating film-forming composition according to the present invention can again be used similarly. However, as described above, since in order to undergo the electrodeposition coating on the first coating layer to be formed, a current does not flow at a voltage not higher than the varistor voltage, a voltage exceeding the varistor voltage must be used. Other conditions do not particularly change.

As described above, the first coating layer to be formed according to the present invention has a varistor property and, therefore, in forming the second coating layer, an initial current value is controlled, and the system is mild, whereby the second coating layer with superior smoothness can be formed.

On the other hand, a coating film to be formed on a first coating layer made of a conventional electrically conductive powder (such as carbon) has a high initial current value as seen in the usual electrodeposition coating and, therefore, the gas evolution is concentrated in the initial stage so that the smoothness of the coating film is inferior.

Furthermore, depending on the type of the powder of an electrically semiconductive substance (for example, in the case of use of molybdenum disulfide), since a further superior corrosion resistance can be given, there gives rise to a characteristic that a good corrosion resistance is obtainable even when a usual rust-resistant pigment is not used.

Also, the present invention exhibits the following superior characteristics. For example, since two-layer electrodeposition coating can be carried out like the usual two-layer electrodeposition coating, a high throwing property is obtained. However, since two-stage current supply is carried out by applying the characteristic of varistor property, a higher throwing property is obtained. That is, in the case of undergoing the two-layer electrodeposition coating, if at the time of forming the first coating layer, the first coating layer is formed by electrodeposition coating at a voltage lower than the varistor voltage, portions which have not been completely coated are subsequently subjected to further electrodeposition coating so that the throwing property is improved. Thereafter, if a voltage of the varistor voltage or higher is applied at the time of forming the second coating layer, the second coating layer can be formed, whereby the total film thickness is improved. Thus, an increase of the film thickness which has never been seen in the past as well as a further improved throwing property can be obtained.

In accordance with the method of the present invention, the cover property in edge portions is improved, and an improved corrosion resistance in edge portions is obtained.

At present, in the field of electrodeposition coating for automobiles, in order to increase the rust resistivity, improvements and designs regarding the resins and paints are made. That is, with respect to the resins, by suppressing the flowability in the edge portions at the time of baking, the film thickness in the edge portions is intended to be ensured. With respect to the paints, by increasing the amount of a pigment, the flowability is depressed, whereby the coating film thickness in the edge portions is ensured, and by adding a rheology control agent, a similar design is made. However, in any of these cases, there are caused such problems that the flowability of the coating film is inferior and that the finish appearance is lowered.

On the other hand, according to the method of the present invention, the sharpness in the edge portions completely disappears by the electrodeposition coating for first coating layer, and the covering of the edge portions is readily carried out in the electrodeposition coating for second coating layer. Accordingly, in designing the paint, the electrodeposition coating can be achieved without difficulty, and the film thickness can be completely ensured, resulting in a great advantage that the corrosion from the edge portions is prevented.

In accordance with the present invention, a high film thickness is obtainable by electrodeposition coating. For example, in a three-coat coating system which is presently employed in automobile body coating, an intemediate coat can be omitted so that a decrease of the process number, prevention of pollution problems, and an improvement of quality are obtainable.

Furthermore, an improvement of quality regarding a one-coat electrodeposition paint is obtainable. For example, in the case of an anionic acrylic deposition paint which is presently employed for the one-coat process, the quality of corrosion resistance is from 120 to 240 hours in terms of the salt spray test. Further, though in a cationic acrylic electrodeposition paint, the quality of corrosion resistance is 480 hours, if the electrodeposition coating film-forming composition of the present invention is applied for the first coating layer by electrodeposition coating, followed by applying thereon the above-described anionic or cationic acrylic electrodeposition paint, a two-layer electrodeposition coating film having superior corrosion resistance and weathering resistance as compared with conventional ones is obtained, whereby a great improvement in the corrosion resistance of an acrylic electrodeposition coating film which has never been achieved can be attained.

Next, while the first coating layer obtained by electrodeposition coating of the electrodeposition coating film-forming composition according to the present invention is smooth and excellent in corrosion resistance comparable to the usual electrodeposition coating films, the same electrodeposition coating film-forming composition is further applied on this coating film by electrodeposition coating to increase the film thickness, whereby the corrosion resistance can be further improved.

Also, a usual cationic electrodeposition paint is applied as the second coating layer by electrodeposition coating to increase the film thickness, whereby not only the corrosion resistance but also various performances inherent thereto can be ensured. Furthermore, the electrodeposition powder coating (EPC) as described in Japanese Patent Publication No. 40585/76 can be applied as the second coating layer by electrodeposition coating in a similar manner, whereby the various performances which EPC possesses can be exhibited. In the light of the above, it is possible to freely undergo electrodeposition coating by the double coating method, which could not be achieved by the conventional electrodeposition coating. Thus, a revolutionary coating step which breaks the common sense in the conventional electrodeposition coating can be practiced in various manners like the usual coating.

EXAMPLES

The present invention will be described with reference to Examples and Comparative Examples. In these examples, all parts and percents are by weight unless otherwise indicated.

EXAMPLE 1

Formulation of first component paste:

| (1) | Epoxy resin for cationic pigment dispersion ("MR-100" made by Shinto Paint Co., Ltd.; non-volatile matter content: 70%) | 64.3 parts |
| (2) | 88% Acetic acid aqueous solution | 2.0 parts |
| (3) | Butyl cellosolve | 13.0 parts |
| (4) | Molybdenum disulfide powder | 167.0 parts |
| (5) | Deionized water | 160.0 parts |

First of all, the aforesaid components (1) to (5) were mixed with 400 parts of glass beads having an average particle diameter of 2 mm, and the mixture was dispersed in a paint shaker for one hour so as to have a particle diameter of not more than 10µ. Thereafter, the glass beads were removed by filtration to obtain a first component paste.

Formulation of second component resin solution:

| (6) | Resin for cationic electrodeposition coating film ("S-Via CED #700 Resin" made by Shinto Paint Co., Ltd.; non-volatile matter content: 72%) (blocked isocyanate-containing polybutadiene-modified epoxy resin) | 680.0 parts |
| (7) | 88% Acetic acid aqueous solution | 3.9 parts |
| (8) | 50% Lactic acid aqueous solution | 1.3 parts |
| (9) | Propyl cellosolve | 15.0 parts |
| (10) | Deionized water | 550.0 parts |

Next, the resin for cationic electrodeposition coating film (6) was heated at 50° C., and the acids (7) and (8) and propyl cellosolve (9) were added thereto with stirring. After keeping the mixture for one hour, the deionized water (10) was gradually added to the resulting mixture to obtain a second resin solution.

Preparation of electrodeposition bath:

| First component paste | 352 parts |
| Second component resin solution | 1549 parts |
| Deionized water | 1410 parts |

The aforesaid first component paste and second component resin solution were mixed, and the deionized water was then gradually added to the mixture with mild stirring to obtain an electrodeposition bath having a solids content of 20.0% and a pH of 6.2.

Using this electrodeposition bath, an electrodeposition paint for first coating layer was prepared, and electrodeposition coating was carried out under the conditions shown in Table 1 below, rinsed with water, and then baked at 170° C. for 20 minutes to obtain a 15 µ-thick good coating film.

Thereafter, the coating film was subjected to electrodeposition coating with, as an electrodeposition paint for second coating layer, a cationic electrodeposition paint ("S-Via CED #700 Gray" made by Shinto Paint Co., Ltd.) under the conditions shown in Table 1, rinsed with water, and then baked at 170° C. for 20 minutes to form a cured electrodeposition coating film having a thickness of 20 µ (total film thickness: 35 µ). The coating film was smooth and uniform. The test results of this coating film are shown in Table 2.

| Example No. | Parts of MoS$_2$ per 100 parts of solids content |
| --- | --- |
| 2 | 15 |
| 3 | 25 |

-continued

| Example No. | Parts of MoS₂ per 100 parts of solids content |
|---|---|
| 4 | 35 |
| 5 | 50 |

The same procedures as in Example 1 were repeated, except that the amount of MoS₂ to be incorporated was changed as described above. Thus, four electrodeposition paints for first coating layer of Examples 2 to 5 having an MoS₂ content ranging from 15 to 50 parts per 100 parts of the solids content were prepared.

The respective electrodeposition paints for first coating layer had a solids content of 20% and a pH ranging from 6.1 to 6.4.

Using each of these electrodeposition paints, electrodeposition coating was carried out under the conditions shown in Table 1 to prepare a coating film for first coating layer.

Next, using a cationic electrodeposition paint "S-Via CED #700 Gray" as an electrodeposition paint for second coating layer, electrodeposition coating was carried out in the same manner as in Example 1 under the conditions shown in Table 1. Thus, the results shown in Table 2 were obtained.

COMPARATIVE EXAMPLE 1

Black paste:

| | | |
|---|---|---|
| (1) | Resin for pigment dispersion ("MR-100") | 74.1 parts |
| (2) | 88% Acetic acid aqueous solution | 2.0 parts |
| (3) | Butyl cellosolve | 23.0 parts |
| (4) | Carbon black | 100.0 parts |
| (5) | Deionized water | 176.0 parts |

The aforesaid components were mixed with 375 parts of glass beads having an average particle diameter of 2 mm, and the mixture was dispersed for 2 hours so as to have a particle diameter of 15 μ. Thereafter, the glass beads were removed by filtration to obtain a black paste.

Preparation of electrodeposition bath:

| | | |
|---|---|---|
| (6) | Black paste as described above | 112.5 parts |
| (7) | Second component resin solution (as in Example 1) | 637.5 parts |
| (8) | Deionized water | 1250.0 parts |

The aforesaid black paste and second component resin solution were mixed, and the deionized water was then gradually added to the mixture with mild stirring to prepare an electrodeposition paint having a carbon black content of 10% in the total solids content. The electrodeposition paint had a solids content of 15% and a pH of 6.2.

Using this electrodeposition paint, a zinc phosphate-treated steel plate was subjected to electrodeposition at a bath temperature of 28° C. and at 150 V for 3 minutes and baked at 170° C. for 20 minutes to prepare a 15 μ-thick coating film for first coating layer.

While this coating film for first coating layer had a good appearance, it was not passed in the salt spray test for 480 hours.

Next, using "S-Via CED #700 Gray", a 20 μ-thick coating film for second coating layer was formed (total film thickness: 35 μ). While its appearance was good, the corrosion resistance for 840 hours and the corrision resistance in edge portions were not passed as shown in Table 2. When the throwing property was measured at 200 V for 3 minutes (under a condition of the film thickness of 20 μ) by the Ford pipe method, it was found to be 19 cm. Further, when the electrodeposition for second coating layer was carried out at not higher than the varistor voltage (not higher than 150 V), the coverability of throwing property was found to be zero as shown in Table 2.

| | Component | Parts |
|---|---|---|
| (1) | Resin for pigment dispersion | 74.1 |
| (2) | 88% Acetic acid aqueous solution | 2.0 |
| (3) | Butyl cellusolve | 23.0 |
| (4) | Carbon black | 85.0 |
| (5) | Lead silicate | 15.0 |
| (6) | Deionized water | 176.0 |

The aforesaid components were treated in the same manner as in Comparative Example 1 to prepare a paint having a solids content of 15% and a pH of 6.3.

Using this paint, a zinc phosphate-treated plate was subjected to electrodeposition at a bath temperature of 28° C. and at 170 V for 30 minutes and baked at 170° C. for 20 minutes to prepare a coating film having a film thickness of 15 μ. This coating film was somewhat non-uniform with respect to the film surface state.

Next, using "S-Via CED #700 Gray", a 20 μ-thick coating film for second coating layer was formed. The appearance thereof reflected the surface roughness of the first coating layer, and the film thickness distribution was somewhat non-uniform as 33 to 37 μ.

When subjected to the salt spray test, while the corrosion resistance in planar portion was passed, the corrosion resistance in edge portions was inferior as 10.8.

When the throwing property was measured at 210 V for 3 minutes (under a condition of the film thickness of 20 μ) by the Ford pipe method, it was found to be 19.5 cm. Further, when the electrodeposition for second coating layer was carried out at not higher than the varistor voltage (not higher than 150 V), the coverability of throwing property was inferior as zero.

COMPARATIVE EXAMPLE 3

An electrodeposition bath was obtained in the same manner as in Example 1, except that the content of the molybdenum disulfide powder was changed to 5 parts per 100 parts of the solids content. Using this electrodeposition bath, the same test as in Example 1 was carried out to obtain the results shown in Table 2. Because of too a small content of molybdenum disulfide, electrical conductivity was not obtained, and an electrodeposition coating film as a second coating layer was not formed.

COMPARATIVE EXAMPLE 4

An electrodeposition bath was obtained in the same manner as in Example 1, except that the content of the molybdenum disulfide powder was changed to 60 parts per 100 parts of the solids content. Using this electrodeposition bath, the same test as in Example 1 was carried out to obtain the results shown in Table 2. The resulting film surface caused surface roughness and was poor in the finishing.

TABLE 1

(Electrodeposition Coating Condition)

| Coating Step | | Coating Condition |
|---|---|---|
| 1. | Work article | SFC stell plate |
| 2. | Surface treatment | Bonderite #3020 treatment |
| 3. | Electrodeposition coating (for 1st coating layer) | Solids content: 20% (adjustment of solids content with deionized water<br>Voltage: 100 to 350 V<br>Charge time: 3 minutes<br>Bath temperature: 28 ± 1° C.<br>Film thickness: 15μ<br>Water rinse: yes |
| | Baking | 20 minutes at 170° C. |
| 4. | Electrodeposition coating (for 2nd coating layer) | Solids content: 20%<br>Voltage: 150 to 400 V<br>Charge time: 3 minutes<br>Bath temperature: 28 ± 1° C.<br>Film thickness: 20μ<br>Water rinse: yes |
| | Baking | 20 minutes at 170° C. |

TABLE 2

| | EXAMPLE No. | | | | | Comparative EXAMPLE No. | | | |
|---|---|---|---|---|---|---|---|---|---|
| | 1 | 2 | 3 | 4 | 5 | 1 | 2 | 3 | 4 |
| | Electrodeposition Paint for 1st Coating Layer | | | | | | | | |
| | $MoS_2$ | $MoS_2$ | $MoS_2$ | $MoS_2$ | $MoS_2$ | electrically conductive carbon | $MoS_2$ | $MoS_2$ | $MoS_2$ |
| | 10 | 15 | 25 | 35 | 50 | 10 | 10 | 5 | 60 |
| | Cationic Electrodeposition Paint for 2nd Coating Layer ("S-Via CED #700 Gray") | | | | | | | | |
| Electrodeposition coating film for 1st coating layer | | | | | | | | | |
| Varistor property | found | found | found | found | found | not found | not found | not found | not found |
| Smoothness (appearance) | good | good | good | good | good | good | rough | good | rough |
| Film thickness (μm) | 15 | 15 | 15 | 15 | 15 | 15 | 15 | 15 | 15 |
| Corrosion resistance (480 hours) | passed | passed | passed | passed | passed | not passed | passed | passed | passed |
| Electrodeposition coating film for 2nd coating layer | | | | | | | | | |
| Total film thickness (μm) | 35 | 35 | 35 | 35 | 35 | 35 | 33-37 | | 35 |
| Smoothness (appearance) | uniform & good | uniform & good | uniform & good | uniform | good | good | rough in 1st coating layer | | rough |
| Adhesion | 100/100 | 100/100 | 100/100 | 100/100 | 100/100 | 100/100 | 100/100 | | 100/100 |
| Impact resistance (½", 500 g) | 50 | 50 | 50 | 50 | 50 | 50 | 50 | | 50 |
| Corrosion resistance in planar portions (840 hours) | passed | passed | passed | passed | passed | not passed | passed | | passed |
| Corrosion resistance in edge | 3.4 | 2.1 | 0.6 | 1.2 | 2.3 | 20.5 | 10.8 | | 2.4 |
| Throwing property of electrodeposition paint for 1st coating layer | 21.0 | 21.5 | 22.0 | 21.0 | 21.0 | 19.0 | 19.5 | | |
| Voltage condition of electrodeposition paint for 2nd coating layer not higher than varistor voltage | 1.0 | 2.0 | 3.0 | 3.0 | 3.0 | 0 | 0 | | |

[Note]
In Comparative Example 3, no coating film was formed.

TEST METHOD (1) Salt spray test:
According to the salt spray test as defined in JIS Z2371.

(2) Throwing property:
According to the Ford pipe method.

(3) Corrosion resistance in edge portions:
A cutter blade made of an SPC soft steel plate (commercial product: OLFALB-10 B large-sized blade) having a length of 100 mm is subjected to a surface treatment with Bonderite #3020 and then to a prescribed electrodeposition coating treatment, followed by providing for the tests.

The corrosion resistance test is carried out in a manner in which the test is carried out for 120 hours by the salt spray test as defined by JIS Z2371, and the number of pitting corrosions are read by using a magnifying glass. The numerical value is expressed as an average value of n=3.

(4) Varistor resistance:
Using each of the electrodeposition paint baths of Examples 1 to 5 and Comparative Examples 1 to 4, a 0.3×100×100 mm steel plate having been subjected to a surface treatment with Bonderite #3020 is subjected to electrodeposition coating under the conditions shown in Table 1, rinsed with water, and then baked. The thus coated plate is amounted in a resistivity cell, YHP1608A (made by Yokogawa-Hewlett-Packard, Ltd.) and examined for the voltage-current characteristic at an applied voltage in the range of from 0 to 100 V by means of a semiconductor parameter analyzer ("YHP4145B" made by Yokogawa-Hewlett-Packard, Ltd.). Then, the value of n in the equation, $I=(V/V_1)^n$ is calculated, and if n is 1.5 or more, the varistor resistance is determined to be found, whereas if n is less than 1.5, the varistor resistance is determined to be not found.

The following can be concluded from the foregoing results.

(1) If the amount of $MoS_2$ is too high, the surface roughness is found, whereas if it is less than 7 parts, the charge does not take place. Accordingly, the $MoS_2$ content is from 7 to 50 parts by weight, practically from 15 to 30 parts by weight, per 100 parts by weight of the solids content.

(2) The film thickness of the electrodeposition coating film as first coating layer (in the dry state) in the range of from 5 to 30 μm, preferably from 10 to 25 μm. Further, the film thickness of the electrodeposition coating film as second coating layer to be formed thereon is from 5 to 50 μm (preferably from 10 to 40 μm) in the case of usual cationic electrodeposition paints and from 5 to 200 μm in the case of the EPC paint, respectively.

(3) The electrodeposition paint for the first coating layer was examined for the throwing property under a set-up condition of a film thickness of 20μ by the Ford pipe method, and the results obtained are shown in Table 2.

The aforesaid pipes and ribbons were each rinsed with water and baked at 170° C. for 20 minutes to form a cured electro-deposition coating film.

Further, using the above-described pipe and ribbon as well as "S-Via CED #700 Gray" as the electrodeposition paint for the second coating layer, the throwing property was measured at a coating voltage of not higher than the varistor voltage for one minute, and the results obtained are shown in Table 2.

In the $MoS_2$-containing ribbons of Examples 1 to 5, since the first coating layer which has already been formed is electrically insulative, a coating film is formed in a portion where the first coating layer is not formed, and a coverability of the throwing property of from 3.0 to 1.0 cm is found. On the other hand, in the case of using electrically conductive carbon (at 100 V for one minute), since the portion of the first coating layer where the coating film is formed exhibits electrical conductivity, an electrodeposition coating film is formed superposed on this portion, whereby no coverability of the throwing property is found.

(4) Improvement of the edge cover property:

A cutter blade having been subjected to a surface treatment with Bonderite #3020 was subjected to electrodeposition coating, and a thus formed coating film was examined for the corrosion resistance in edge portions. The results obtained are shown in Table 2.

A coating film obtained by using "S-Via CED #700 Gray" alone revealed a bad result as 25.8.

Accordingly, since in the conventional electrodeposition coating, it is impossible to undergo double coating, a special edge covering electrodeposition paint is required in the edge coating. On the other hand, in the case according to the method of the present invention, the sharpness of the edges disappears by the electrodeposition coating film applied as the first coating layer, and the edge cover property by the paint for the second coating layer is good, whereby a corrosion-resisting effect of the corrosion resistance in edge portions is exhibited.

(5) The finishing of the coating system comprising a two-layer electrodeposited coating film (15μ of the coating film of Example 3 and 20μ of "S-Via CED #700 Gray"; total=35μ) having provided thereon a top coat paint (a melamine.alkyd type) in a thickness of 30μ was explicitly better than that of a two coat and two bake type (total thickness: 50μ) comprising a film made singly of "CED #700 Gray" (thickness: 20μ) having a top coat directly provided thereon and equal to the finish appearance of a three coat and three bake type (total thickness: 80μ) having an intermediate coat paint (an oil-free melamine.alkyd type) provided therebetween.

EXAMPLE 6

An $MoS_2$-containing anionic electrodeposition paint corresponding to "S-Via AED #300" using an aqueous polybutadiene-modified resin, which is made by Shinto Paint Co., Ltd., was used as an electrodeposition paint for the first coating layer.

Anionic electrodeposition pigment dispersion:

| (1) | Resin for pigment dispersion (a poly-butadiene resin made by Shinto Paint Co., Ltd.; non-volatile matter content: 81.5%) | 64.0 parts |
|---|---|---|
| (2) | Triethylamine | 7.1 parts |
| (3) | Propyl cellosolve | 48.2 parts |
| (4) | Molybdenum disulfide powder | 149.4 parts |

The aforesaid components (1) to (4) were mixed with 280 parts of glass beads having an average particle diameter of 2 mm, and the mixture was dispersed in a paint shaker for one hour so as to have a particle diameter of not more than 10μ. Thereafter, the glass beads were removed by filtration to obtain a dispersion paste.

Preparation of electrodeposition bath:

| (5) | Dispersion paste as described above | 268 parts |
|---|---|---|
| (6) | Resin for anionic coating film (a resin for "S-Via AED #300 made by Shinto Paint Co., Ltd.; non-volatile matter content: 80%) | 399 parts |
| (7) | Melamine resin ("Sumimal M-100C" by Sumitomo Chemical Company, Limited) | 7.7 parts |
| (8) | Triethylamine | 42.4 parts |
| (9) | Deionized water | 2854 parts |

The aforesaid components (6) and (7) where charged, and the component (8) was thrown under stirring. After stirring for 30 minutes, the component (5) was thrown, and the mixture was kept under stirring at not higher than 50° C. for 2 hours.

Thereafter, the mixture was diluted while gradually adding the deionized water (9), to obtain an electrodeposition bath having a solids content of 14.1% and a pH of 8.2.

Using the aforesaid electrodeposition bath, a zinc phosphate-treated steel plate was subjected to electrodeposition coating at a bath temperature of 28° C. and at 150 V for 3 minutes and calcined at 170° C. for 20 minutes. A thus formed coating film had a film thickness of 15μ and exhibited a good coated surface state.

Using "S-Via CED #700 Gray", a second coating layer was provided thereon by electrodeposition coating. As a result, a 20 μ-thick coating film was deposited, and the coated surface was uniform and of a good quality.

This coating film was subjected to the salt spray test. As a result, both of the electrodeposition coating film as first coating layer (15μ) and the electrodeposition coating film as second coating layer (35μ) were passed at 360 hours and 840 hours, respectively.

EXAMPLE 7

Using the $MoS_2$-containing electrodeposition paint bath as used in Example 3, a 15 μ-thick electrodeposition coating film as the first coating layer was obtained under the same conditions. Using an anion electrodeposition paint ("S-Via AEC #300" made by Shinto Paint Co., Ltd.), a second coating layer was provided thereon by electrodeposition coating at a bath temperature of 28° C. and at 250 V for 3 minutes and baked at 170° C. for 20 minutes. As a result, a coating film had a film thickness of 20μ was further deposited, and the coated surface was uniform and of a good quality.

On the other hand, a zinc phosphate-treated steel plate was subjected to electrodeposition coating with an AED #300 electrodeposition paint at a bath temperature of 28° C. and at 200 V for 3 minutes and baked at 170° C. for 20 minutes to obtain a coating film having a film thickness of 20μ.

These coating films were subjected to the salt spray test. As a result, both of the coating film made singly of AED #300 (20μ) and the two-layer electrodeposition coating film (35μ) were passed at 360 hours and 840 hours, respectively.

EXAMPLE 8

Using the MoS$_2$-containing electrodeposition paint bath as used in Example 3, a 15 μ-thick electrodeposition coating film as the first coating layer was obtained on a steel plate treated with iron phosphate ("Bonderite #1077"). Using a one-coat anion electrodeposition paint ("S-Via AEC #108" made by Shinto Paint Co., Ltd.), a second coating layer was provided thereon by electrodeposition coating at a bath temperature of 28° C. and at 230 V for 3 minutes and baked at 170° C. for 20 minutes. As a result, a coating film had a film thickness of 20μ was further deposited, and the coated surface was uniform and of a good quality.

On the other hand, an iron phosphate-treated steel plate was subjected to electrodeposition coating with AED #108 at a bath temperature of 28° C. and at 180 V for 3 minutes and baked at 170° C. for 20 minutes to obtain a coating film having a film thickness of 20μ.

These coating films were subjected to the salt spray test. As a result, both of the coating film made singly of AED #108 (20μ) and the two-layer electrodeposition coating film (35μ) were passed at 240 hours and 720 hours, respectively.

EXAMPLE 9

Using the MoS$_2$-containing electrodeposition paint bath as used in Example 3, a 15 μ-thick electrodeposition coating film as the first coating layer was obtained on a two-layer alloy-plated steel plate treated with zinc phosphate.

Using a one-coat cation electrodeposition paint ("S-Via CED #1000" made by Shinto Paint Co., Ltd.), a second coating layer was provided thereon by electrodeposition coating at a bath temperature of 28° C. and at 280 V for 3 minutes and baked at 175° C. for 20 minutes. As a result, a coating film had a film thickness of 20μ was further deposited, and the coated surface was uniform and of a good quality. On the other hand, the same two-layer alloy-plated steel plate treated zinc phosphate was subjected to electrodeposition coating with CED #1000 (beige) at a bath temperature of 28° C. and at 230 V for 3 minutes and baked at 175° C. for 20 minutes to obtain a coating film having a film thickness of 20μ.

These coating films were subjected to the salt spray test. As a result, both of the coating film made singly of CED #1000 (20μ) and the two-layer electrodeposition coating film (35μ) were passed at 480 hours and 840 hours, respectively.

EXAMPLE 10

Using the MoS$_2$-containing electrodeposition paint bath as used in Example 3, a 15 μ-thick electrodeposition coating film as the first coating layer was obtained under the same conditions. Using an electrodeposition powder coating ("EPC #300 (black)" made by Shinto Paint Co., Ltd.), a second coating layer was provided thereon by electrodeposition coating at a bath temperature of 25° C. and at 200 V for 30 seconds and baked at 180° C. for 30 minutes. As a result, a coating film had a film thickness of 40μ was further deposited, and the coated surface was uniform and of a good quality.

These coating films were subjected to the salt spray test. As a result, they were passed at 1000 hours.

In the light of the above, in accordance with the present invention, an electrodeposition coating film with varistor property is obtainable and, therefore, not only it is possible to undergo two-layer electrodeposition coating, but also superior performances such as high throwing property, high corrosion resistance, and edge corver property are obtainable. Furthermore, it is possible to undergo multistage electrodeposition coating, and a coating film having a high film thickness and high corrosion resistance can be obtained. Moreover, since there are various superior effects such as an effect that a coating system by the multicoat coating mode which has been impossible in the conventional electrodeposition coating can be achieved like the usual coating, the present invention can be expected to be widely applied in the various industrial coating areas.

What is claimed is:

1. A coating method which comprises forming a first electrodeposition coating layer having varistor property on a metal article by an electrodeposition coating method with the use of an electrodeposition coating film-forming composition containing from 7 to 50 parts by weight of an electrically semiconductive substance per 100 parts by weight of the solid content of the composition, and then forming a second electrodeposition coating layer on said first electrodeposition coating layer by an electrodeposition coating method with the use of an anionic or cationic electrodeposition paint or coating composition, while applying a voltage exceeding the varistor voltage.

2. A coating method as claimed in claim 1 wherein the electrically semiconductive substance is molybdenum disulfide.

* * * * *